(12) United States Patent
Hofstätter et al.

(10) Patent No.: US 11,152,141 B2
(45) Date of Patent: Oct. 19, 2021

(54) CERAMIC MULTI-LAYER COMPONENT AND METHOD FOR PRODUCING A CERAMIC MULTI-LAYER COMPONENT

(71) Applicant: TDK Electronics AG, Munich (DE)

(72) Inventors: Michael Hofstätter, Graz (AT); Alfred Hofrichter, Hartberg (AT); Thomas Feichtinger, Graz (AT)

(73) Assignee: TDK ELECTRONICS AG, Munich (DE)

( * ) Notice: Subject to any disclaimer, the term of this patent is extended or adjusted under 35 U.S.C. 154(b) by 0 days.

(21) Appl. No.: 15/734,221

(22) PCT Filed: Jun. 21, 2019

(86) PCT No.: PCT/EP2019/066476
§ 371 (c)(1),
(2) Date: Dec. 1, 2020

(87) PCT Pub. No.: WO2019/243578
PCT Pub. Date: Dec. 26, 2019

(65) Prior Publication Data
US 2021/0210257 A1    Jul. 8, 2021

(30) Foreign Application Priority Data

Jun. 22, 2018  (DE) .................. 10 2018 115 085

(51) Int. Cl.
*H01C 7/02* (2006.01)
*H01C 7/04* (2006.01)
*H01C 1/14* (2006.01)

(52) U.S. Cl.
CPC ............. *H01C 7/02* (2013.01); *H01C 1/1406* (2013.01); *H01C 1/1413* (2013.01); *H01C 7/04* (2013.01)

(58) Field of Classification Search
CPC .......... H01C 7/02; H01C 7/04; H01C 1/1406; H01C 1/1413
See application file for complete search history.

(56) References Cited

U.S. PATENT DOCUMENTS 4,584,628 A * 4/1986 Cichanowski ........... H01G 4/30
29/25.42
5,414,588 A * 5/1995 Barbee, Jr. .......... C23C 14/0036
361/304

(Continued)

FOREIGN PATENT DOCUMENTS

DE    102011113496 A1   3/2013
DE    102013102686 A1   9/2014
(Continued)

*Primary Examiner* — Kyung S Lee
(74) *Attorney, Agent, or Firm* — Slater Matsil, LLP

(57) ABSTRACT

A ceramic multi-layer component and a method for producing a ceramic multi-layer component are disclosed. In an embodiment a ceramic multi-layer component includes a stack with ceramic layers and electrode layers arranged between them, wherein the ceramic layers and the electrode layers are arranged above one another along a stacking direction, wherein at least one first electrode layer extends along a first main extension direction from a first end region to a second end region of the first electrode layer, and wherein the at least one first electrode layer has a current-carrying capacity that decreases along the first main extension direction.

20 Claims, 5 Drawing Sheets

(56) References Cited

U.S. PATENT DOCUMENTS

| | | | | |
|---|---|---|---|---|
| 6,608,547 | B1* | 8/2003 | Greier | H01C 7/105 338/20 |
| 8,587,920 | B2* | 11/2013 | Lee | H01G 4/30 361/301.4 |
| 9,583,262 | B2* | 2/2017 | Rinner | H01C 7/18 |
| 2005/0214517 | A1* | 9/2005 | Sugimoto | H01G 4/308 428/209 |
| 2010/0008017 | A1 | 1/2010 | Ito et al. | |
| 2010/0079925 | A1* | 4/2010 | Togashi | H01G 4/005 361/306.3 |
| 2010/0085682 | A1* | 4/2010 | Abe | H01G 4/012 361/303 |
| 2010/0091429 | A1* | 4/2010 | Koga | H01G 4/232 361/321.2 |
| 2010/0206624 | A1* | 8/2010 | Feichtinger | H01G 4/40 174/260 |
| 2014/0022695 | A1* | 1/2014 | Schmidt | H01C 7/18 361/301.4 |
| 2014/0160619 | A1* | 6/2014 | Kim | H01G 4/012 361/301.4 |
| 2016/0020029 | A1 | 1/2016 | Hirao | |
| 2017/0092425 | A1 | 3/2017 | Takashima et al. | |

FOREIGN PATENT DOCUMENTS

| | | |
|---|---|---|
| JP | H0521211 A | 1/1993 |
| JP | H08148731 | 6/1996 |
| JP | H10208971 A | 8/1998 |
| JP | 2004228468 A | 8/2004 |

* cited by examiner

CERAMIC MULTI-LAYER COMPONENT AND METHOD FOR PRODUCING A CERAMIC MULTI-LAYER COMPONENT

This patent application is a national phase filing under section 371 of PCT/EP2019/066476, filed Jun. 21, 2019, which claims the priority of German patent application 102018115085.7, filed Jun. 22, 2018, each of which is incorporated herein by reference in its entirety.

TECHNICAL FIELD

A ceramic multi-layer component and a method for the manufacture of a ceramic multi-layer component are disclosed.

BACKGROUND

Ceramic multi-layer components usually use metal internal electrodes in order to conduct the electrical current into the active volume of the component. The internal electrodes must be designed here in such a way that when operating current densities that could lead to damaging the electrodes are not present. In the case, for example, of overvoltage protection elements such as, for example, an MLV ("multi-layer varistor"), the current density can reach 10 GA/m$^2$ and more. A specific minimum cross-section of the internal electrode is necessary in order to be able to keep the current density below a critical level, and to ensure an adequate electrical connection to an outer electrode.

Specific minimum cross sections of the internal electrodes are also necessary for ceramic thermal sensors based on NTC (NTC: "negative temperature coefficient") materials and PTC ("positive temperature coefficient") materials with multi-layer construction, since the resistance of the internal electrodes may only constitute a negligible proportion of the total resistance in order not to corrupt the measurement signal such sensors.

SUMMARY

Embodiments provide a ceramic multi-layer component. Further embodiments provide a method for the manufacture of a ceramic multi-layer component.

According to one form of embodiment, a ceramic multi-layer component comprises a stack with ceramic layers and electrode layers arranged between them.

According to at least one further form of embodiment, a stack with ceramic layers and electrode layers arranged between them is manufactured in the case of a method for the manufacture of a ceramic multi-layer component.

The features and forms of embodiment described below relate equally to the ceramic multi-layer component and to the method for the manufacture of a ceramic multi-layer component.

The ceramic multi-layer component can in particular have a stacking direction along which the layers of the stack, i.e. the ceramic layers and the electrode layers, are arranged. The ceramic layers can have or consist of one or a plurality of ceramic materials that exhibit a desired functionality. The stack can in particular comprise a ceramic layer with or consisting of an electrically conductive or semiconducting ceramic material in the stacking direction between two electrode layers. One or a plurality of ceramic layers can, for example, comprise or consist of a varistor material, a thermistor material, in particular a PTC or NTC thermistor material, and/or a dielectric material. The ceramic multi-layer component can accordingly be designed as, for example, an overvoltage protection element or as a ceramic thermal sensor. The stack can furthermore end in the stacking direction with, for example, dielectric ceramic layers. The ceramic layers and/or the electrode layers of the stack can particularly preferably be manufactured from pastes with binders and/or other organic and/or inorganic materials as what are known as green tapes, stacked on top of one another and subsequently sintered.

The stack can furthermore comprise outer surfaces that bound the stack in directions perpendicular to the stacking direction. The stack can end in the stacking direction with a lower side and an upper side. The multi-layer component can, for example, have a rectangular cross-section when viewed along the stacking direction, so that the stack accordingly comprises four outer surfaces, and can be designed as a cuboid. Outer electrodes can be attached to at least one or a plurality of external surfaces, by means of which electrode layers arranged in the stack can be contacted.

According to at least one further form of embodiment, the stack comprises at least one first electrode layer that has a main extension direction. The at least one first electrode layer can extend along the main extension direction from a first end region to a second end region of the first electrode layer. The main extension direction can in particular be perpendicular to the stacking direction. The main extension direction can furthermore be a direction that is perpendicular to an external surface. The at least one first electrode layer has a greater extension along the main extension direction than in every other direction that is perpendicular to the main extension direction.

The at least one first electrode layer with the first end region can particularly preferably adjoin a first exterior surface of the stack which is, in particular, an external surface that is perpendicular to the main extension direction. A first outer electrode can, furthermore, be arranged at least at the first external surface that is in electrical contact with the at least one first electrode layer and that thus electrically contacts the at least one first electrode layer. The at least one first electrode layer can in particular adjoin the first outer electrode, and, with the first end region, be in direct contact with the first outer electrode.

The first end region of the at least one first electrode layer can, in particular, form a supply zone through which an electrical current can be carried into the at least one first electrode layer or out of the at least one electrode layer when the ceramic multi-layer component is operating. This can particularly preferably take place through a previously-described first outer electrode in electrical contact with the first end region.

According to a further form of embodiment, the at least one first electrode layer has a current-carrying capacity that reduces along the main extension direction. This can in particular signify that the at least one first electrode layer can withstand a higher maximum current at the first end region than at the second end region. The maximum current indicates that local current intensity at which local damage to the electrode layer just barely does not take place.

According to a further form of embodiment, the at least one first electrode layer has a specific electrical conductivity that decreases along the main extension direction. The at least one first electrode layer can have a current-carrying capacity that becomes less through a specific electrical conductivity that reduces along the main extension direction. In particular, the at least one first electrode layer can have a higher specific electrical conductivity in the first end region than in the second end region. This can, for example, be achieved in that the at least one first electrode layer comprises a mixture with or consisting of at least one first material with a first specific electrical conductivity and a second material with a second specific electrical conductivity, wherein the second specific electrical conductivity is lower than the first specific electrical conductivity, and the ratio of the first material to the second material becomes smaller along the main extension direction. In other words, the at least one first electrode layer comprises a higher proportion of the first material as compared with the second material in the first end region than in the second end region. The at least one first electrode layer can here be free from the second material in the first end region and/or be free from the first material in the second end region. As an alternative to this, the first and the second material can be contained together in the at least one first electrode layer in the first end region and/or in the second end region.

The varying mixture with or consisting of the first and second material can, for example, be manufactured through a locally varying proportion of sintering particles with or consisting of the first material and through a locally varying proportion of sintering particles with or consisting of the second material in the green tape applied for the manufacture of the at least one first electrode layer.

According to a further form of embodiment, the ratio of the first material to the second material decreases in at least one partial region of the at least one first electrode layer along the main extension direction. The at least one partial region can here, and in the following, comprise or be formed of the first end region, the second end region, a region between the first and second end regions, or a combination of the said regions. The reduction in the ratio of the first to the second material can, for example, be continuous. In other words, the proportion of the first material can decrease continuously, while the proportion of the second material can increase continuously. Alternatively or in addition, the reduction of the ratio in at least one partial region can also occur stepwise, i.e. in at least one or a plurality of steps. The steps in the ratio of the first material to the second material can be created through step changes in the proportion of the first and/or the second material.

According to a further form of embodiment, the first material comprises a metal. The first material can, for example, comprise or be one or a plurality of metals selected from Ni, Cu, Ag and Pd. Like the first material, the second material can be electrically conductive. The second material can, for example, also comprise a metal, for example one or a plurality of the metals mentioned above, but in a composition such that the second material, as described above, exhibits a lower specific electrical conductivity than the first material. A lower specific electrical conductivity can also signify that the second material is electrically insulating. The second material can, for example, comprise or consist of an electrically insulating ceramic material, such as silicon dioxide and/or aluminum oxide.

According to a further form of embodiment, the at least one first electrode layer has a center of mass that is located closer to the first end region than to the second end region. This can signify that the at least one first electrode layer has a geometrical center along the main extension direction that divides the at least one first electrode layer into two halves measuring equal lengths along the main extension direction. With reference to the geometrical center, the at least one first electrode layer accordingly comprises more material, in particular more electrically conductive material in the half that faces toward the first end region than in the half that faces toward the second end region. Through the presence of more material closer to the first end region, in particular through the presence of more electrically conductive material, the current-carrying capacity in this region can be greater than in the region that is closer to the second end region.

For example, the at least one first electrode layer can have a greater thickness at the first end region than at the second end region. The thickness of the at least one first electrode layer can thus decrease along the main extension direction. The thickness of a layer of the stack of the ceramic multi-layer component can be measured here and below in particular in the direction of the stacking direction. The thickness of the at least one first electrode layer can decrease stepwise in at least one partial region, for example. This can in particular signify that the thickness of the at least one first electrode layer decreases in at least one partial region in one or a plurality of steps, i.e. exhibits one or plurality of stepwise reductions. As an alternative to this, the thickness of the at least one first electrode layer can also decrease continuously in at least one partial region.

Alternatively or in addition to a thickness becoming less along the main extension direction, the at least one first electrode layer can have a greater width at the first end region than at the second end region. The width along the main extension direction can accordingly decrease. Here and below, the width of a layer of the stack of the ceramic multi-layer component can be measured in a direction perpendicular to the stacking direction and perpendicular to the main extension direction of the at least one first electrode layer. The width of the at least one first electrode layer can for example decrease stepwise in at least one partial region. This can in particular signify that the width of the at least one first electrode layer decreases in at least one partial region in one or a plurality of steps, i.e. exhibits one or a plurality of stepwise reductions. As an alternative to this, the width of the at least one first electrode layer can also decrease continuously in at least one partial region.

Alternatively or in addition, the at least one first electrode layer can comprise openings that extend in the stacking direction into the at least one first electrode layer. The openings can in particular extend through the at least one first electrode layer and be filled with the material of the adjoining ceramic layers or also with a different ceramic material, for example a dielectric ceramic material. The openings can in particular exhibit an occupancy density that increases along the main extension direction. In other words, the at least one first electrode layer has more openings close to the second end region than close to the first end region.

To manufacture the at least one first electrode layer, methods by means of which the variations described relating to the electrode layer geometry and/or the electrode layer composition can be manufactured, for example multi-layer screen printing, inhomogeneous screen printing or inkjet printing, can particularly preferably be used. A varying thickness of the at least one first electrode layer can, for example, be manufactural by means of multi-layer screen printing. The thickness can be adjusted here through a locally varying multiple printing of appropriate surface regions. Cavities can deliberately be incorporated into or provided in a screen for the inhomogeneous screen printing, which can also be suitable as a further processing possibility for the manufacture of regions of the at least one first electrode layer with different thicknesses. The local material throughput can be adjusted through locally differing densities and/or sizes of the cavities in the screen, so that regions of the at least one first electrode layer whose thickness also varies can be manufactured. Regions of different thickness as well as regions with different material compositions can be manufactured by means of inkjet printing, in particular by means of 3D inkjet printing. Regions of different width can be achieved through the described measures and/or through the use of suitable masks when applying the material of the at least one electrode layer.

According to a further form of embodiment, the stack of the ceramic multi-layer component comprises a plurality of first electrode layers. The first electrode layers can be arranged above one another in the stacking direction and separated from one another by ceramic layers. Each of the first electrode layers, all of which can be contacted through the first outer electrode, can comprise one or a plurality of the previously described features. Preferably two or more, or particularly preferably all, of the first electrode layers can be of the same design, i.e. in particular exhibit the same geometrical features and/or the same composition features.

According to a further form of embodiment, the stack of the ceramic multi-layer component comprises at least one second electrode layer that extends along a main extension direction from a first end region to a second end region. A second outer electrode that contacts electrically the at least one second electrode layer can be arranged on a second external surface, different from the first external surface, wherein the at least one second electrode layer adjoins the first end region at the second external surface. The main extension direction of the at least one first electrode layer and the main extension direction of the at least one second electrode layer can thus be different. The two primary directions of extension are particularly preferably aligned parallel to and opposite to one another.

The at least one second electrode layer can comprise one or a plurality of the features described previously for the at least one first electrode layer, wherein the first and second electrode layers can particularly preferably be arranged on different levels in the stack. The at least one second electrode layer and the at least one first electrode layer can particularly preferably be of the same design. Multiple second electrode layers can furthermore be present. Preferably two or more, or particularly preferably all, of the second electrode layers can be of the same design, i.e. in particular exhibit the same geometrical features and/or the same compositions. If multiple first and/or second electrode layers are present, these can particularly preferably be arranged in alternation above one another in the stacking direction.

In comparison with the ceramic multi-layer component described here with at least one electrode layer that exhibits a current-carrying capacity becoming smaller with a distance from an external surface becoming greater, internal electrodes with a constant thickness and a rectangular surface and with a homogeneous material composition are usually manufactured in known multi-layer components, wherein the minimum possible thickness and width of the internal electrodes is determined, depending on the electrode material composition used, by the required current-carrying capacity taking the current density to be expected in the supply zone, i.e. at the contact with an outer electrode, into consideration. Since the current impressed into an internal electrode can, however, be diffused continuously into the adjoining ceramic material along the internal electrode, the current density decreases with increasing distance from the supply zone in the internal electrode, and is usually far below the critical level at the end of the internal electrode that is opposite to the supply zone. This point is not taken into consideration in the usual design of internal electrodes, whose dimensioning is determined by the dimensions required at the feed zone, and is over-dimensioned at the end located opposite to the supply zone. In contrast to this, it can be possible to optimize the consumption of material in the manufacture of the electrode layer, and thus to reduce the use of material and/or costs, through the deliberate adjustment described here of geometry and/or of the material composition distribution of the at least one first electrode layer in the ceramic multi-layer component described here. In addition to the reduction in the material consumption and the cost savings associated therewith, a further advantage can be found in a possible improvement of the pulse-related robustness and current-carrying capacity for the same component volume. The current-carrying capacity of the at least one first electrode layer can particularly preferably be adjusted through the described measures in such a way that, taking the current diffusion into the adjoining ceramic layers into consideration, the current density in the at least one first electrode layer is essentially constant along the main extension direction.

BRIEF DESCRIPTION OF THE DRAWINGS

Further advantages, advantageous forms of embodiment and developments emerge from the exemplary embodiments described below in connection with the figures.

DETAILED DESCRIPTION OF ILLUSTRATIVE EMBODIMENTS

Figure 1:
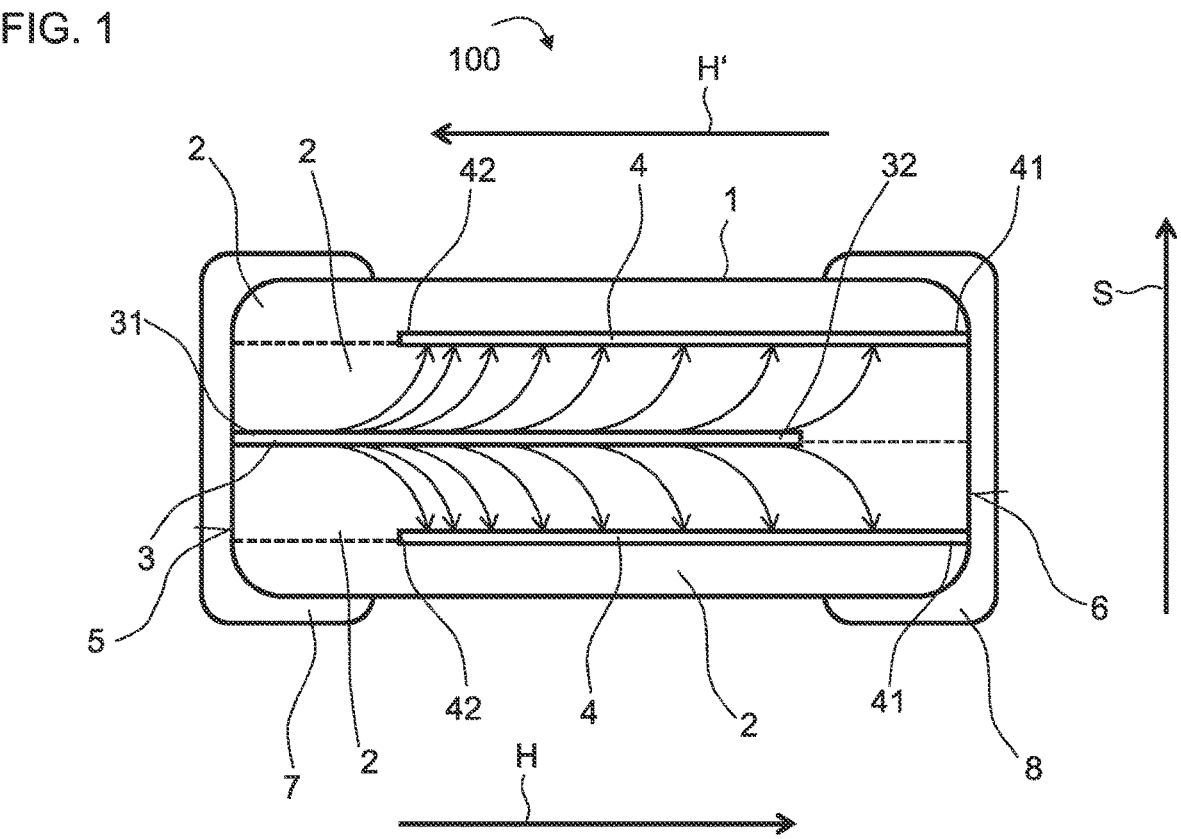
FIG. 1 shows a schematic illustration of a ceramic multi-layer component according to a first exemplary embodiment.

In the embodiments and figures, identical, similar or identically acting elements are provided in each case with the same reference numerals. The elements illustrated and their size ratios to one another should not be regarded as being to scale, but rather individual elements, such as for example layers, components, devices and regions, may have been made exaggeratedly large to illustrate them better and/or to aid comprehension.

The following figures each show exemplary embodiments of a ceramic multi-layer component 100 that is designed, purely by way of example, as an overvoltage protection element, in particular as what is known as a multi-layer overvoltage protection element. As an alternative to this, embodiments of the ceramic multi-layer components as, for example, thermal sensors, are possible through an appropriate selection of the ceramic material.

A schematic sectional view of an exemplary embodiment of the ceramic multi-layer component 100 that comprises a primary body formed of a stack 1 with ceramic layers 2 and electrode layers 3, 4 that are arranged above one another along a stacking direction S is shown in FIG. 1. The stack 1 furthermore comprises external surfaces that bound the stack 1 in directions perpendicular to the stacking direction S. The opposing external surfaces 5, 6 can be recognized in FIG. 1. The external surfaces 9, 10 are in addition recognizable in the following FIGS. 2A to 2D and 4A. The multi-layer component 100 can, for example, have a rectangular cross-section when viewed along the stacking direction S, so that the stack 1 accordingly comprises four external surfaces and can be designed as a cuboid. The stack 1 ends in the stacking direction with a lower side and an upper side.

The multi-layer component 100 is, as described above, designed, purely by way of example, as an overvoltage protection element, in particular as a multi-layer overvoltage protection element, in which at least the ceramic layers 2 that are arranged in the stacking direction S between the electrode layers 3, 4 comprise or consist of a varistor material. The stack 1 can finish in the stacking direction S with ceramic layers 2 that can also comprise a varistor material or, alternatively, a dielectric material. The electrode layers 3, 4 can preferably comprise or consist of one or a plurality of metals selected, for example, from Ni, Cu, Ag and Pd.

The ceramic layers 2 and the electrode layers 3, 4 can be manufactured of corresponding pastes, for example in the form of green tapes, applied to one another and sintered together in order to manufacture the ceramic multi-layer component 100. Printing methods such as, for example, screen printing or inkjet printing, using masks where appropriate, by means of which the pastes can be applied with the desired materials in the form of sintering particles mixed with binders, can for example be used for this purpose. Layer boundaries between the ceramic layers 2 are indicated in FIG. 1 by means of the dashed lines, which indicate the respective applied layers, and which are no longer present in the finished multi-layer component 100 as a result of the sintering process. Methods such as multi-layer screen printing, inhomogeneous screen printing and/or 3D inkjet printing can also be used, particularly in respect of the electrode layers 3, 4. The ceramic layers 2 can, for example, have a thickness, i.e. an extension along the stacking direction S, of between 1 μm and 200 μm. The electrode layers 3, 4 can, for example, have a thickness between 0.1 μm and 10 μm.

Outer electrodes can be attached to at least one or a plurality of external surfaces, by means of which electrode layers 3, 4 arranged in the stack can be contacted. A first outer electrode 7 and a second outer electrode 8, which can be embodied as one or a plurality of layers, are applied in the illustrated exemplary embodiments on the outer surfaces 5, 6 that can be recognized in FIG. 1, which are also referred to below as the first outer surface 5 and the second outer surface 6. The outer electrodes 7, 8 can comprise one or a plurality of metals selected from Cu, Cr, Ni, Ag and Au, for example. The outer electrodes 7, 8 can, for example, be vapor-deposited or sputtered. The outer electrodes 7, 8 can preferably have layer sequences with layers of Cr/Cu/Au or Cr/Cu/Ag or Cr/Ni/Ag or Cr/Ni/Ag. The outer electrodes 7, 8 are preferably in direct contact with the electrode layer 3 that can also be referred to below as the first electrode layer 3, or with the electrode layers 4 that can also be referred to below as the second electrode layers 4, so that the electrode layers 3, 4 are contacted electrically by the outer electrodes 7, 8.

The multi-layer component 100 is drawn in FIG. 1 with, purely by way of example, a first electrode layer 3 and with two second electrode layers 4. As an alternative to this it is also possible for more than one first electrode layer 3, as well as only one or more than two second electrode layers 4 to be present, which can preferably be separated from one another by ceramic layers 2 in the stacking direction S, applied in alternation on top of one another. The ceramic multi-layer component boo can thus comprise at least one first electrode layer 3 and at least one second electrode layer 4.

The at least one first electrode layer 3 extends from a first end region 31 that adjoins the first external surface 5 and the first external electrode 7, along a main extension direction H to a second end region 32, while the second electrode layers 4 correspondingly extend from a first end region 41 that adjoins the second external surface 6 and the second external electrode 8, along a main extension direction H', parallel to and aligned opposite to the main extension direction H, to a second end region 42. The first end regions 31, 41 can, in particular, form supply zones via which, when the ceramic multi-layer component 100 is in operation, an electrical current can be fed into the electrode layers or drawn out of the electrode layers, depending on the current direction. A corresponding, purely exemplary, current flow is indicated in FIG. 1 by means of the arrows between the first electrode layer 3 and the second electrode layers 4. Since the current injected into the first electrode layer 3 can continuously dissipate into the ceramic along the main extension direction H, the current intensity decreases with increasing distance to the supply zone formed by the first end region 31 in the first electrode layer 3. The at least one first electrode layer 3 is therefore designed such that it has a current-carrying capacity that reduces along the main extension direction H. The at least one first electrode layer 3 can accordingly withstand a higher maximum current at the first end region 31 than at the second end region 32. Exemplary embodiments for corresponding embodiments of the at least one first electrode layer 3 are shown in the following figures. The second electrode layers 4 can preferably have the same design as the first electrode layer 3. In the case of a plurality of first electrode layers, these can also preferably be of the same design.

FIGS. 2A to 2D show sectional illustrations through a multi-layer component wo like that of FIG. 1 along a sectional plane that extends perpendicularly to the stacking direction through the at least one first electrode layer 3. In the exemplary embodiments illustrated, the at least one first electrode layer 3 has a center of mass C that is located closer to the first end region 31 than to the second end region 32, the position of the center of mass C being only indicated schematically in the figures. The at least one first electrode layer 3 furthermore has a geometrical center along the main extension direction H, as indicated by the dashed line, which divides the at least one first electrode layer 3 along the main extension direction H into two equally long halves. As seen from the geometrical center, the center of mass C thus lies in the half that adjoins the first end region 31. The at least one first electrode layer 3 accordingly comprises more material, in particular more electrically conductive material in the half that faces toward the first end region 31 than in the half that faces toward the second end region 32. In this way it is possible to ensure that the current-carrying capacity is greater in the first end region 31 than in the second end region 32.

Figure 2A:
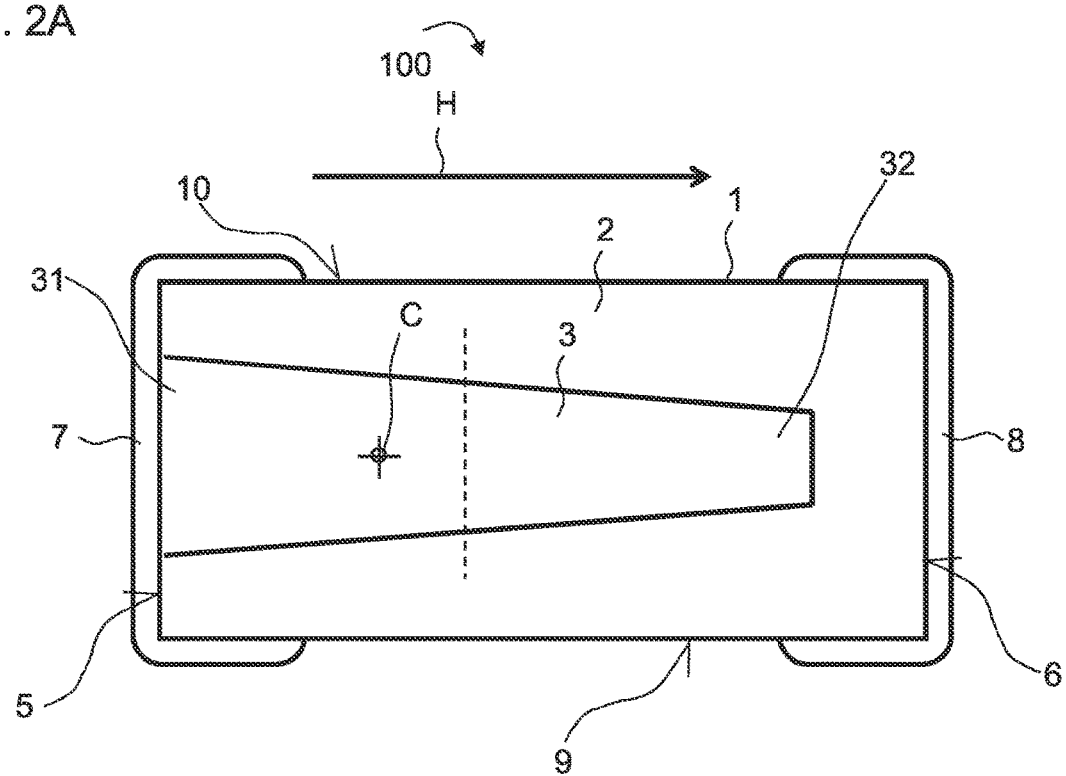
FIGS. 2A to 2D show schematic illustrations of multi-layer components according to further exemplary embodiments.
Figure 2B:
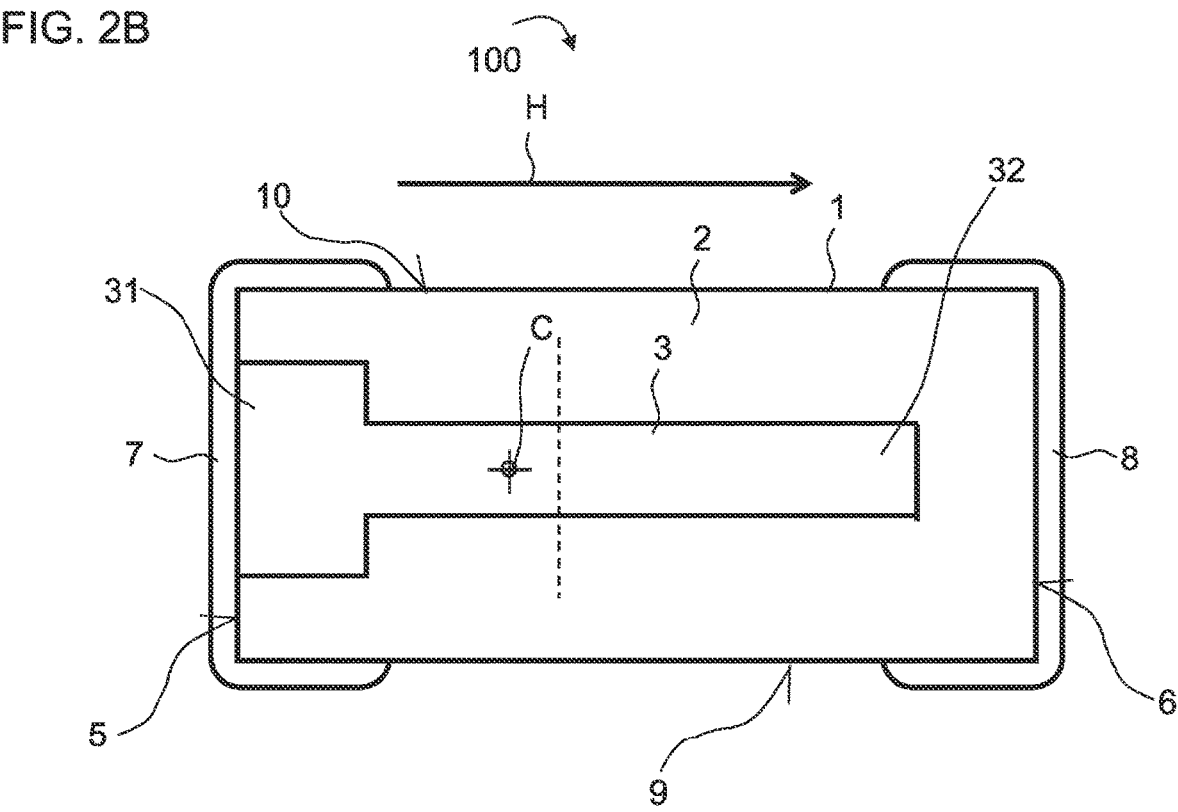
Figure 2C:
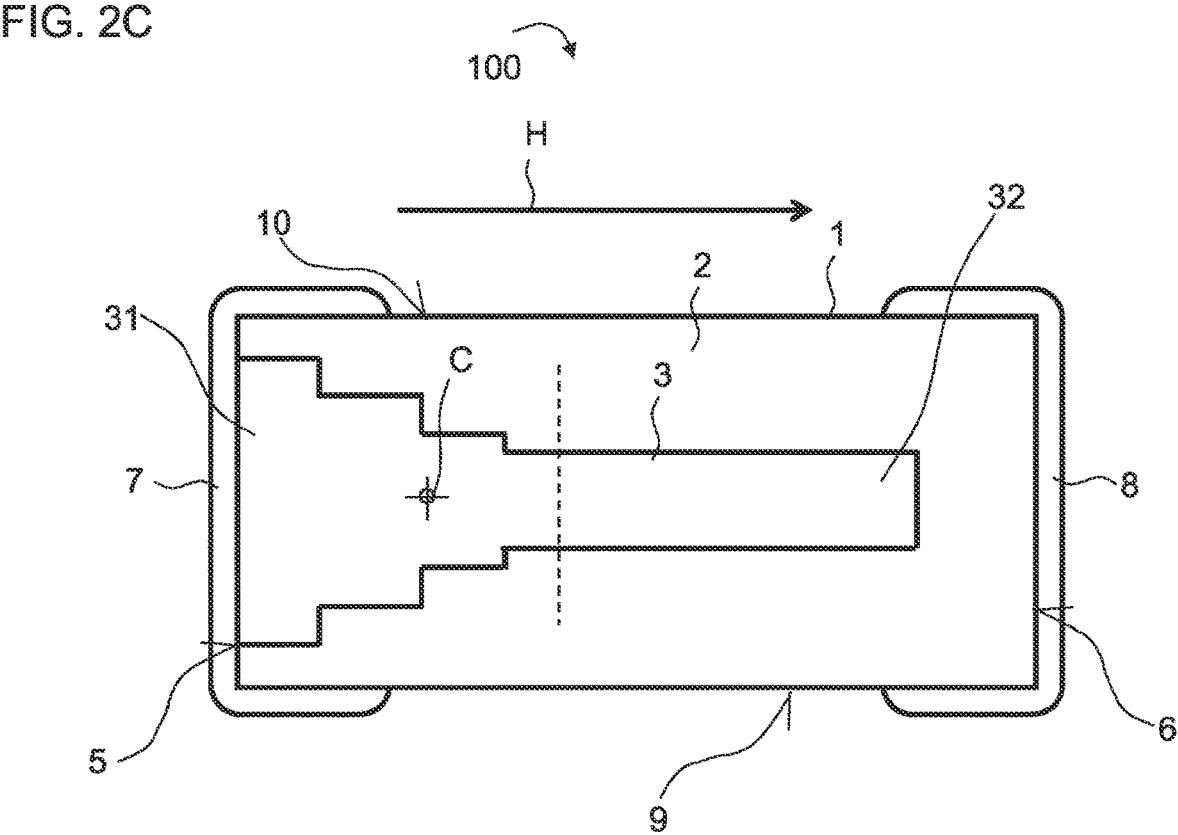
Figure 2D:
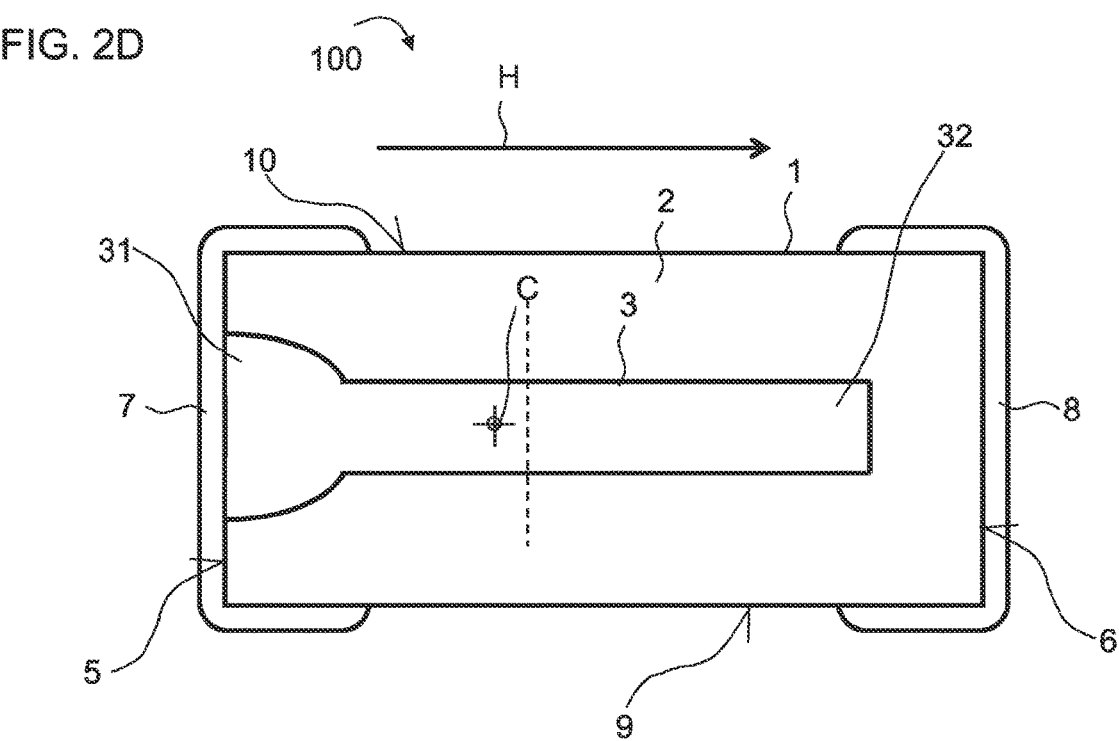

In the exemplary embodiments of FIGS. 2A to 2D the position of the center of mass C described has the effect that the at least one first electrode layer 3 has a greater width at the first end region 31 than at the second end region 32. This means that the width of the at least one first electrode layer 3 measured in a direction perpendicular to the stacking direction S and perpendicular to the main extension direction H decreases along the main extension direction H. The width in at least one partial region can, for example, decrease continuously. A first electrode layer 3 is shown in FIG. 2A, whose width becomes smaller in a linear and continuous manner over the entire length of the main extension direction H. The first electrode layer 3 can, as shown, be of trapezoidal design for this purpose. The width of the at least one first electrode layer 3 can furthermore decrease stepwise in at least one partial region. In the exemplary embodiment shown in FIG. 2B, the width of the first electrode layer 3 decreases for example in one step, or in the exemplary embodiment shown in FIG. 2C in a plurality of steps. As shown in FIG. 2D, the reduction in width is not only restricted to electrode layers shaped as polygons, but can also include surfaces with edges that are not straight lines. Mask-based printing methods, or inkjet printing methods can for example be used to manufacture the electrode layer shapes illustrated.

Figure 3A:
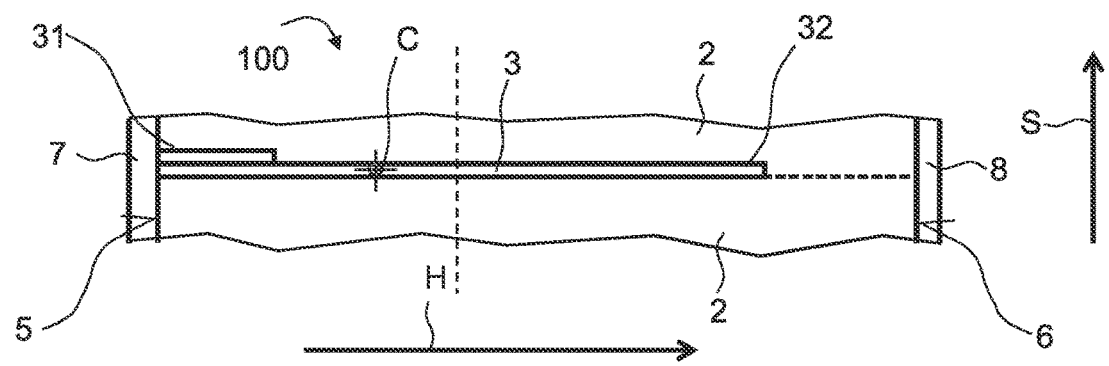
FIGS. 3A and 3B show schematic illustrations of multi-layer components according to further exemplary embodiments.
Figure 3B:
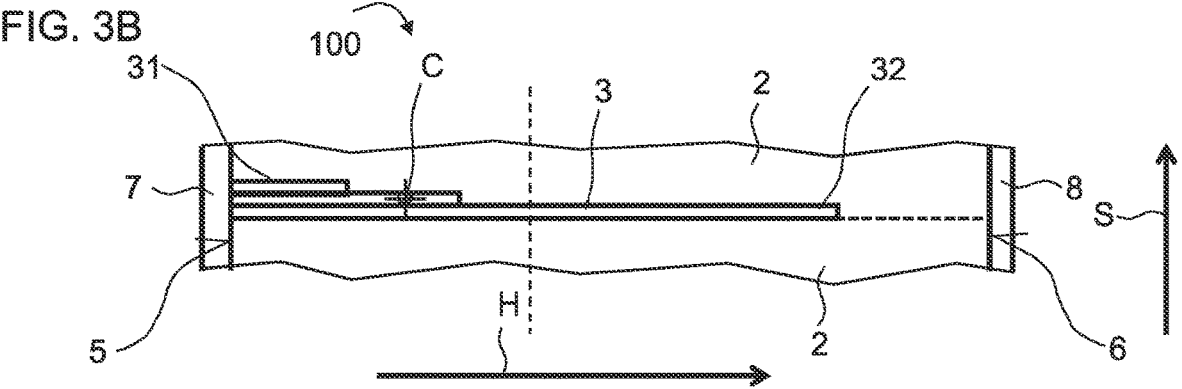

In the exemplary embodiments of FIGS. 3A and 3B, the at least one first electrode layer 3 has a greater thickness at the first end region 31 than at the second end region 32. As in the preceding exemplary embodiments, it can be ensured that the center of mass C is closer to the first end region 31 than to the second end region 32. The thickness of the at least one first electrode layer 3, as is shown in FIGS. 3A and 3B, can for example decrease stepwise in at least one partial region. The thickness of the first electrode layer 3 can, for example, decrease in one step, as is shown in FIG. 3A, or in a plurality of steps, as is shown in FIG. 3B. To manufacture a thickness that decreases in a stepwise manner, a multi-layer screen printing method can, for example, be used. A varying thickness can be manufactured here through the multiple printing of appropriate surface regions. An inhomogeneous screen printing method in which the material throughput can be adjusted through a density and/or size of cavities of a screen, can furthermore also be used. A 3D inkjet printing method can also be used. A continuously reducing thickness can in particular be manufactured by means of the latter method. The electrode layers illustrated in FIGS. 3A and 3B can, when viewed along the stacking direction S, for example have a rectangular cross-section, or a cross-section described in connection with the preceding figures with a decreasing width.

Figure 4A:
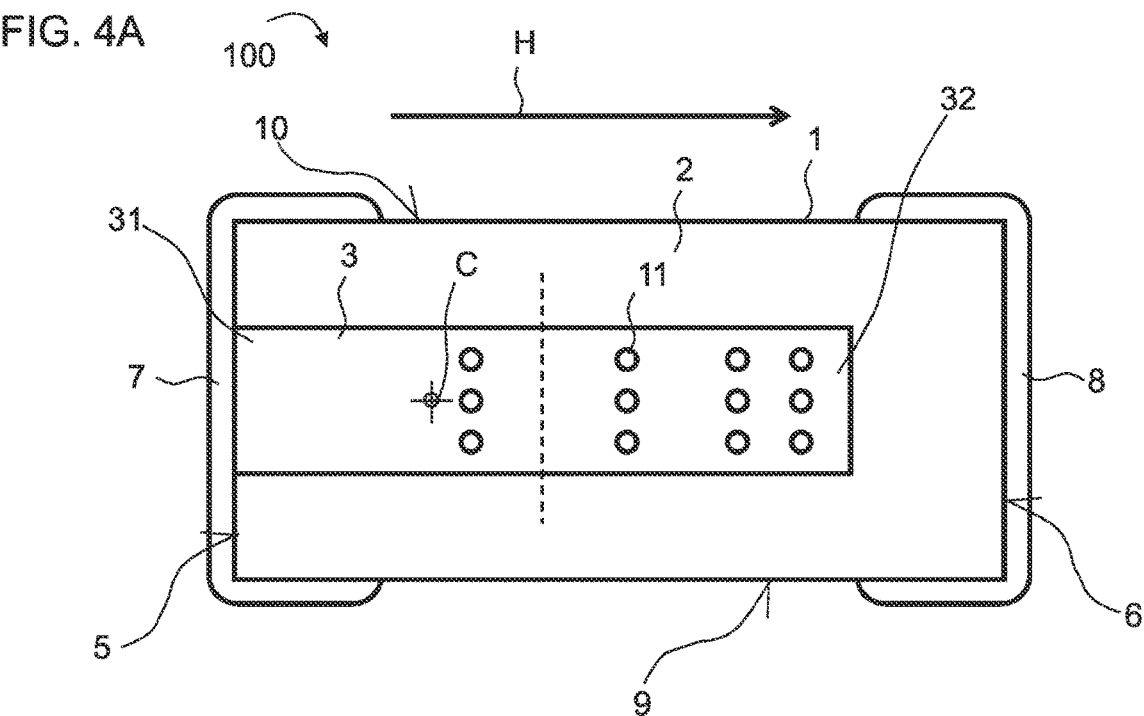
FIGS. 4A and 4B show schematic illustrations of multi-layer components according to further exemplary embodiments.
Figure 4B:
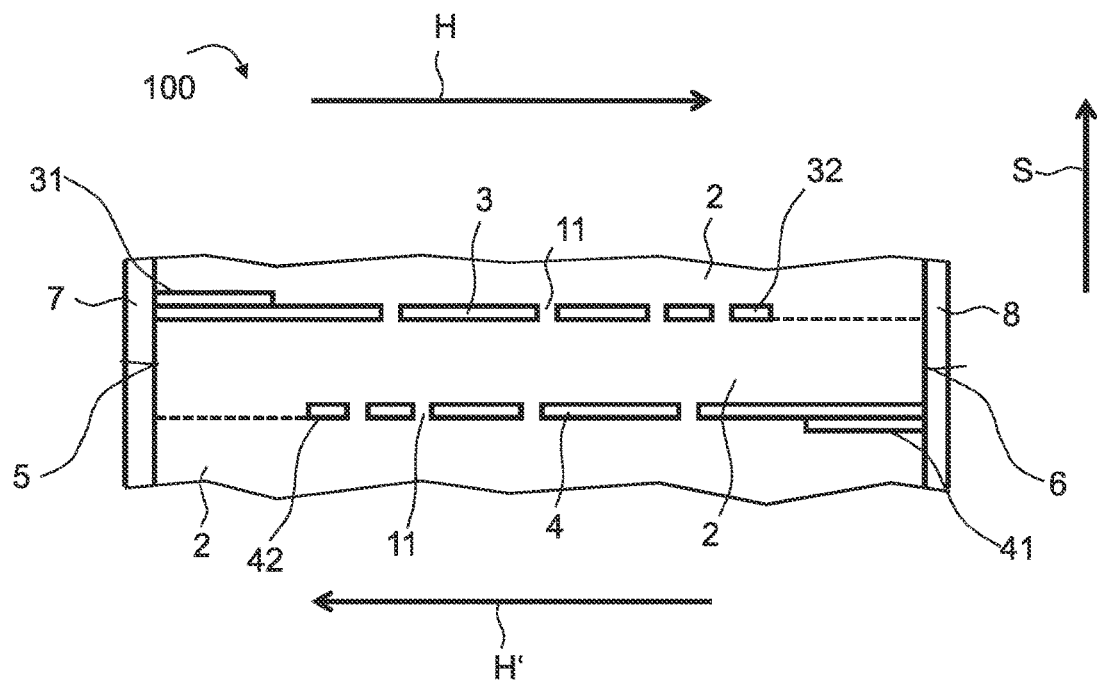

Exemplary embodiments of the ceramic multi-layer component 100 with the at least one first electrode layer 3 that comprises openings 11 that extend in the stacking direction S into the at least one first electrode layer 3, and particularly preferably extend through the at least one first electrode layer 3, are shown in FIGS. 4A and 4B. The openings 11 can be filled with the material of the adjoining ceramic layers 2 or also with a different ceramic material, for example a dielectric ceramic material. As is shown in FIG. 4A, the openings 11 have an occupancy density that increases along the main extension direction H, so that the at least one first electrode layer 3 has more openings near to the second end region 32 than near to the first end region 31, whereby again a shift in the center of mass C in the direction of the first end region 31 is achieved. The number and arrangement of the openings 11 shown in FIG. 4A is to be understood as purely exemplary. It can also be possible for the diameter of the openings to become greater with increasing distance from the first end region 31.

As is shown in FIG. 4B, the openings 11 can also be combined with a varying thickness, as described in connection with the exemplary embodiments of FIGS. 3A and 3B. In addition to this, an alternative or additional combination with a varying width, as described in connection with the exemplary embodiments of FIGS. 2A to 2D, is also possible. As explained above and shown in FIG. 4B, first and second electrode layers 3, 4 can in particular be of the same design.

As is described in the preceding exemplary embodiments, the electrode layers of the multi-layer component can have a shape that tapers along the main extension direction in terms of the width and/or the thickness, as well as, alternatively or in addition, openings with an occupancy density that becomes greater, or an opening diameter that becomes larger, along the main extension direction to reduce the electrode layer material, whereby an efficient consumption of material can be achieved. The geometrical design of the electrode layers can in particular be done in such a way that the local current density within the electrode layers, depending on the usual operating conditions to be expected, preferably remains constant, and always below a critical level, in spite of the current-carrying capacity becoming smaller along the main extension direction.

Alternatively or in addition to the geometrical variations described, the at least one first electrode layer can have a specific electrical conductivity that decreases along the main extension direction, whereby again a current-carrying capacity that becomes smaller along the main extension direction can be achieved. In particular, the at least one first electrode layer can have a higher specific electrical conductivity in the first end region than in the second end region. This can be achieved in that the at least one first electrode layer comprises a mixture with or consisting of at least one first material with a first specific electrical conductivity and a second material with a second specific electrical conductivity, wherein the second specific electrical conductivity is lower than the first specific electrical conductivity, and the ratio of the first material to the second material becomes smaller along the main extension direction. The at least one first electrode layer accordingly comprises a higher proportion of the first material as compared with the second material in the first end region than in the second end region. The at least one first electrode layer can here be free from the second material in the first end region and/or be free from the first material in the second end region. As an alternative to this, the first and the second material can be contained together in the at least one first electrode layer in the first end region and/or in the second end region. The varying mixture with or consisting of the first and second material can, for example, be achieved through a locally varying proportion of sintering particles with or consisting of the first material and through a locally varying proportion of sintering particles with or consisting of the second material in the green tape applied for the manufacture of the at least one first electrode layer. A 3D inkjet printing method can preferably be used to manufacture a varying ratio between the first and second material.

Figure 5A:
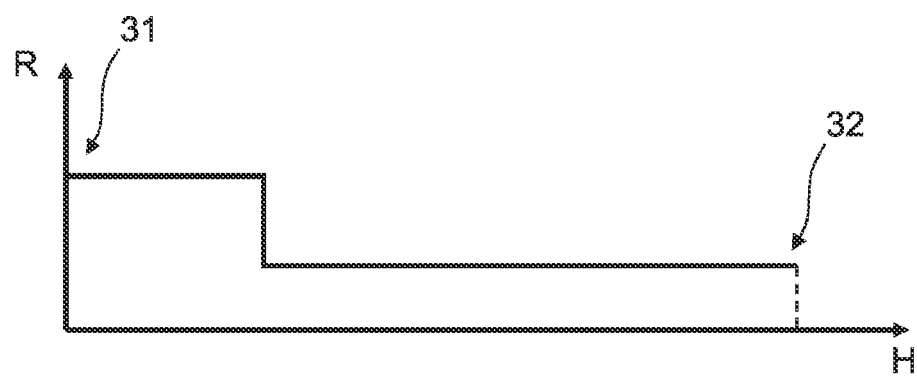
FIGS. 5A and 5B show schematic illustrations of compositions of an electrode layer of a multi-layer component according to further exemplary embodiments.
Figure 5B:
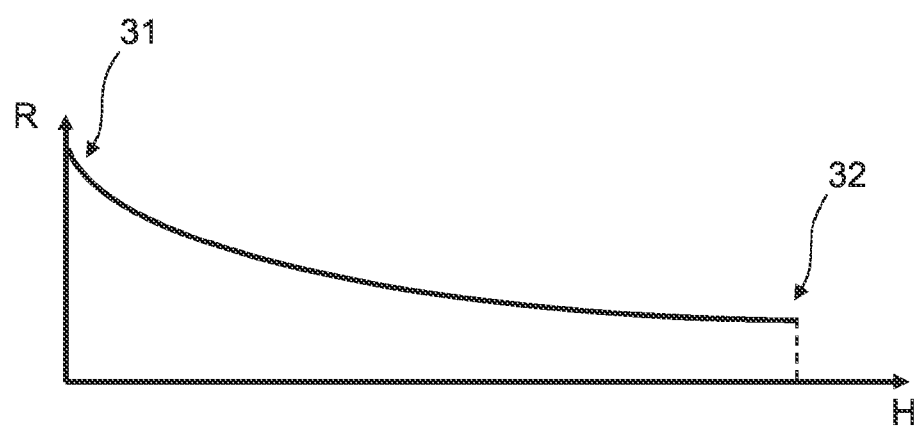

As is shown in FIGS. 5A and 5B, the ratio R of the first material to the second material correspondingly decreases in at least one partial region of the at least one first electrode layer along the main extension direction H. The drop in the ratio R between the first and second material can, as is indicated in FIG. 5A, occur in a stepwise manner, i.e., as shown, in a single step or alternatively also in multiple steps. The drop in the ratio R can furthermore for example also be continuous, as is indicated in FIG. 5B.

The first material can, particularly preferably, be a metal, in particular one or a plurality of metals selected from Ni, Cu, Ag and Pd. The second material can, like the first material, be electrically conductive and also comprise a metal, for example one or a plurality of the metals mentioned above, but in a composition such that the second material exhibits a lower specific electrical conductivity than the first material. The second material can, furthermore, also be electrically insulating, and can for example comprise or consist of an electrically insulating ceramic material such as, for example, silicon dioxide and/or aluminum oxide.

The features and embodiments described in connection with the figures can also be combined with one another according to further embodiments, even if not all such combinations are explicitly described. Furthermore, the embodiments described in connection with the figures can alternatively or additionally have further features according to the description in the general part.

The invention is not limited by the description based on the embodiments to these embodiments. Rather, the invention includes each new feature and each combination of features, which includes in particular each combination of features in the patent claims, even if this feature or this combination itself is not explicitly explained in the patent claims or embodiments.

The invention claimed is:

1. A ceramic multi-layer component comprising:
a stack with ceramic layers and electrode layers arranged between them,
wherein the ceramic layers and the electrode layers are arranged above one another along a stacking direction (S),
wherein at least one first electrode layer extends along a main extension direction (H) from a first end region to a second end region of the first electrode layer,
wherein the at least one first electrode layer has a current-carrying capacity that decreases along the main extension direction, and
wherein the at least one first electrode layer has a specific electrical conductivity that decreases along the main extension direction, and/or
wherein the at least one first electrode layer comprises a mixture of at least one first material with a first specific electrical conductivity and a second material with a second specific electrical conductivity that is lower than the first specific electrical conductivity, and a ratio of the first material to the second material becomes smaller along the main extension direction.

2. The multi-layer component as claimed in claim 1, wherein the ratio decreases continuously in at least one partial region.

3. The multi-layer component as claimed in claim 1, wherein the ratio decreases in a stepwise manner in at least one partial region.

4. The multi-layer component as claimed in claim 1, wherein the first material comprises a metal.

5. The multi-layer component as claimed in claim 1, wherein the second material is electrically conductive.

6. The multi-layer component as claimed in claim 5, wherein the second material comprises a metal.

7. The multi-layer component as claimed in claim 1, wherein the first material and/or the second material is selected from Ni, Cu, Ag, or Pd.

8. The multi-layer component as claimed in claim 1, wherein the second material is electrically insulating.

9. The multi-layer component as claimed in claim 8, wherein the second material comprises a ceramic material.

10. The multi-layer component as claimed in claim 1, wherein the at least one first electrode layer has a center of mass (C) that is located closer to the first end region than to the second end region.

11. The multi-layer component as claimed in claim 10, wherein the at least one first electrode layer has a greater thickness and/or a greater width at the first end region than at the second end region.

12. The multi-layer component as claimed in claim 11, wherein a thickness and/or a width of the at least one first electrode layer decreases in a stepwise manner in at least one partial region.

13. The multi-layer component as claimed in claim 11, wherein a thickness and/or a width of the at least one first electrode layer decreases in a continuous manner in at least one partial region.

14. The multi-layer component as claimed in claim 1, wherein the at least one first electrode layer comprises openings that extend into the first electrode layer in the stacking direction.

15. The multi-layer component as claimed in claim 14, wherein the openings exhibit an occupancy density that increases along the main extension direction.

16. The multi-layer component as claimed in claim 1, wherein the stack has outer surfaces that bound the stack in directions perpendicular to the stacking direction,
wherein the at least one first electrode layer adjoins the first end region at a first outer surface, and
wherein a first outer electrode that contacts the at least one first electrode layer electrically is arranged at the first outer surface.

17. The multi-layer component as claimed in claim 1, wherein at least one second electrode layer extends along a main extension direction (H') from a first end region to a second end region of the second electrode layer,
wherein a second outer electrode that contacts the at least one second electrode layer electrically is arranged at a second outer surface that is different from a first outer surface,
wherein the at least one second electrode layer adjoins the first end region at the second outer surface and
wherein the at least one second electrode layer and the at least one first electrode layer are of the same design.

18. A method for manufacturing of the ceramic multi-layer component as claimed in claim 1, wherein the at least one first electrode layer is manufactured by multi-layer screen printing, by inhomogeneous screen printing, or by inkjet printing.

19. A ceramic multi-layer component comprising:
a stack with ceramic layers and electrode layers arranged between them,
wherein at least one first electrode layer extends along a main extension direction from a first end region to a second end region of the first electrode layer,
wherein the at least one first electrode layer has a specific electrical conductivity that decreases along the main extension direction, and/or
wherein the at least one first electrode layer comprises a mixture of at least one first material with a first specific electrical conductivity and a second material with a second specific electrical conductivity that is lower than the first specific electrical conductivity, and the at least one first electrode layer comprises a higher proportion of the first material as compared with the second material in the first end region than in the second end region.

20. The multi-layer component as claimed in claim 19, wherein the first material is selected from Ni, Cu, Ag or Pd, and wherein the second material is electrically insulating.

* * * * *